United States Patent
Humfeld et al.

(10) Patent No.: US 10,501,595 B2
(45) Date of Patent: Dec. 10, 2019

(54) INSERTION OF CATALYST INTO DRY CARBON FIBERS PRIOR TO RESIN IMPREGNATION

(71) Applicant: The Boeing Company, Chicago, IL (US)

(72) Inventors: Keith Daniel Humfeld, Federal Way, WA (US); Gwen Marie Lanphere Gross, Redmond, WA (US)

(73) Assignee: The Boeing Company, Chicago, IL (US)

( * ) Notice: Subject to any disclaimer, the term of this patent is extended or adjusted under 35 U.S.C. 154(b) by 125 days.

(21) Appl. No.: 15/333,826

(22) Filed: Oct. 25, 2016

(65) Prior Publication Data
US 2018/0112048 A1 Apr. 26, 2018

(51) Int. Cl.
| | | |
|---|---|---|
| *C08J 5/24* | (2006.01) | |
| *D01F 9/12* | (2006.01) | |
| *D01F 11/10* | (2006.01) | |

(52) U.S. Cl.
CPC .............. *C08J 5/24* (2013.01); *D01F 9/12* (2013.01); *D01F 11/10* (2013.01); *C08J 2400/00* (2013.01)

(58) Field of Classification Search
CPC . C08J 5/24; C08J 2400/00; D01F 9/12; D01F 11/10
See application file for complete search history.

(56) References Cited

U.S. PATENT DOCUMENTS

| | | | | |
|---|---|---|---|---|
| 3,395,105 A | | 7/1968 | Washburn et al. | |
| 3,975,479 A | * | 8/1976 | McClean | B29B 15/10 264/102 |
| 5,589,523 A | * | 12/1996 | Sawaoka | C08J 3/241 427/213.3 |
| 2005/0245161 A1 | * | 11/2005 | Sain | C08H 8/00 442/374 |
| 2006/0216490 A1 | * | 9/2006 | Ishii | B29C 70/16 428/292.1 |
| 2010/0178487 A1 | * | 7/2010 | Arai | C08J 5/24 428/300.1 |

(Continued)

FOREIGN PATENT DOCUMENTS

| | | |
|---|---|---|
| EP | 0672707 A2 | 9/1995 |
| EP | 3000850 A1 | 3/2016 |
| EP | 3124517 A1 | 2/2017 |

OTHER PUBLICATIONS

T700S Data Sheet, TORAYCA, No. CFA-005; found at www.torayusa.com; last visited Apr. 17, 2019.*

(Continued)

*Primary Examiner* — James M Mellott
(74) *Attorney, Agent, or Firm* — Duft & Bornsen, PC

(57) ABSTRACT

Systems and methods are provided for fabrication of enhanced carbon fiber laminates that utilize encapsulated catalyst. One embodiment is a method that includes acquiring a batch of dry fibers, and acquiring a batch of catalyst capsules that each comprise catalyst that accelerates polymerization of monomers of a resin, and a shell that encapsulates the catalyst and liquefies at a curing temperature. The method further includes interspersing the catalyst capsules among the dry fibers, and impregnating the fibers with the resin after interspersing the catalyst capsules with the fibers.

18 Claims, 11 Drawing Sheets

(56) References Cited

U.S. PATENT DOCUMENTS

2013/0295811 A1* 11/2013 Shinmen ............... D01D 5/253
442/192

OTHER PUBLICATIONS

T800S Data Sheet, TORAYCA, No. CFA-005; found at www.torayusa.com; last visited Apr. 17, 2019.*
European Office Action; Application 17197632.7-1102; dated Apr. 20, 2018.
European Search Report; Application No. 17197632.7-1102; dated Mar. 20, 2018.
J.Lee, C. Soutis; Thickness effect on the compressive strength of Y800/924C carbon fibre-epoxy laminates. Aerospace Engineering, The University of Sheffield; www.sciencedirect.com.
Patent Application 14814989.
Database XP002771944 WPI 2017 Clarivate Analytics.
NL Search Report; NL2017758.
European Search Report; Application 19150091.7-1102; dated Apr. 11, 2019.

* cited by examiner

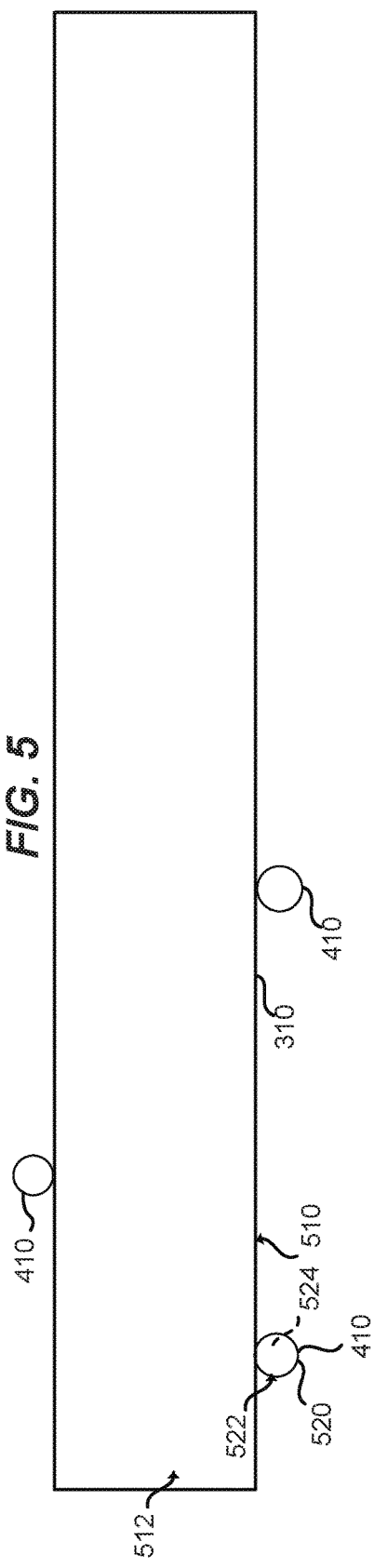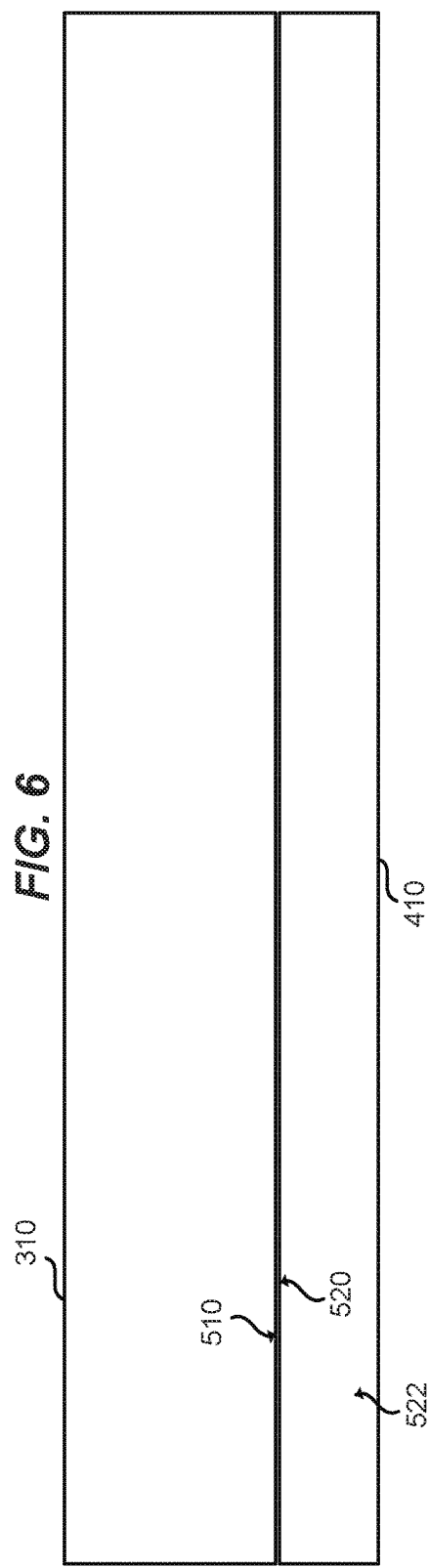

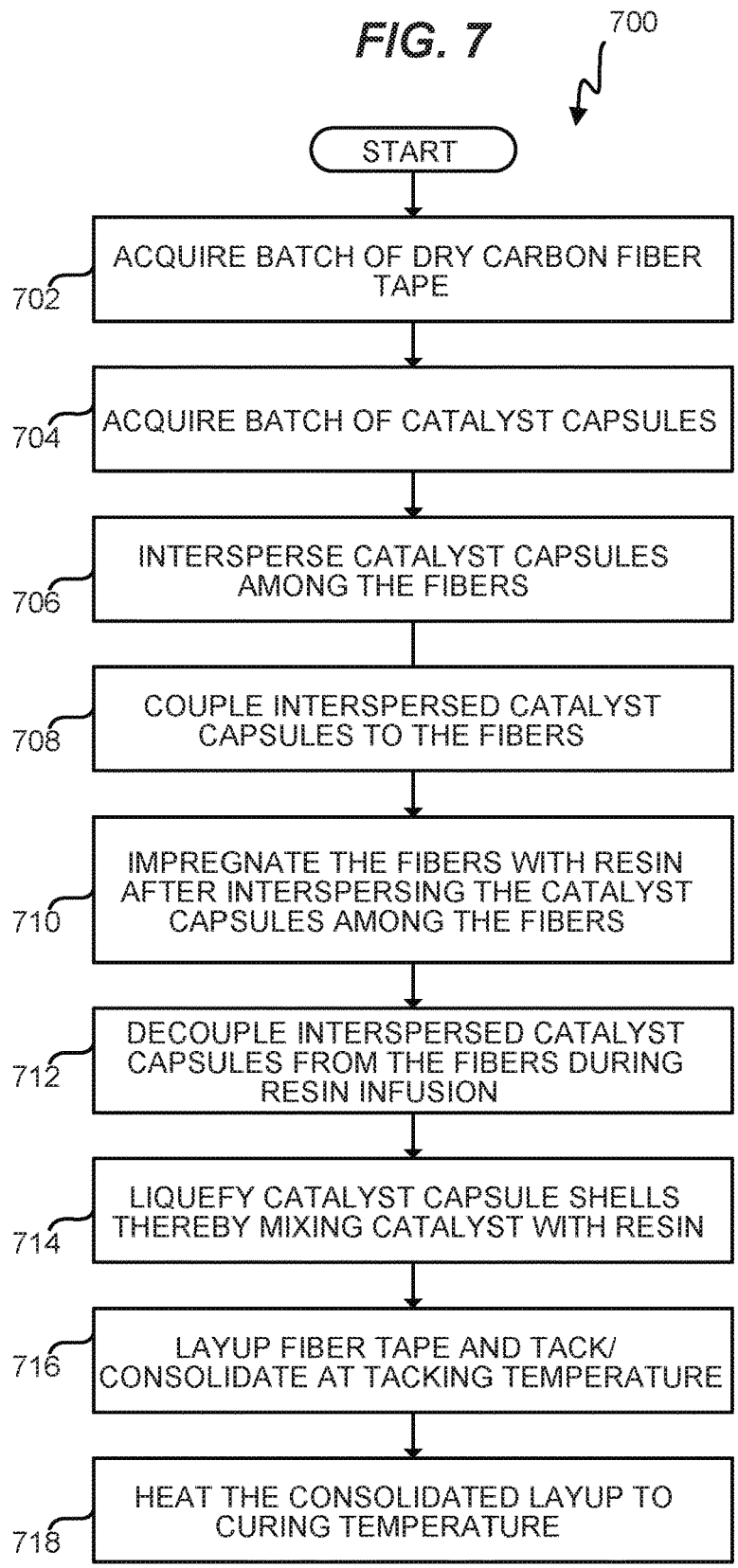

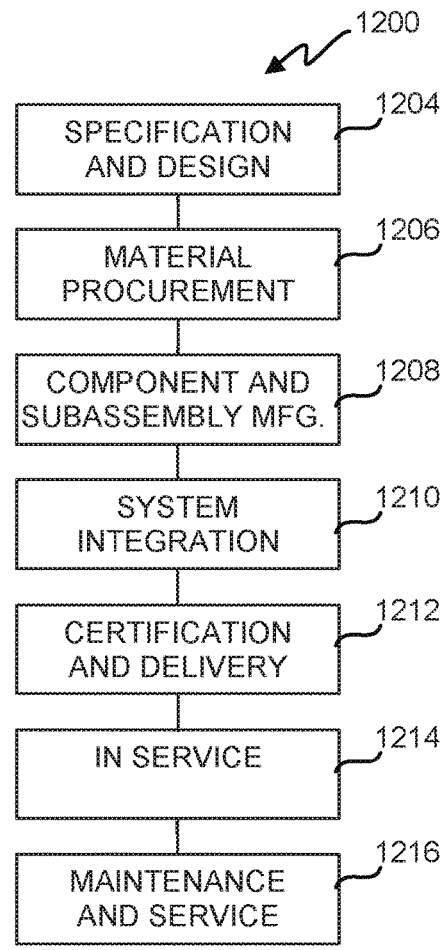
*FIG. 12*
*FIG. 13*
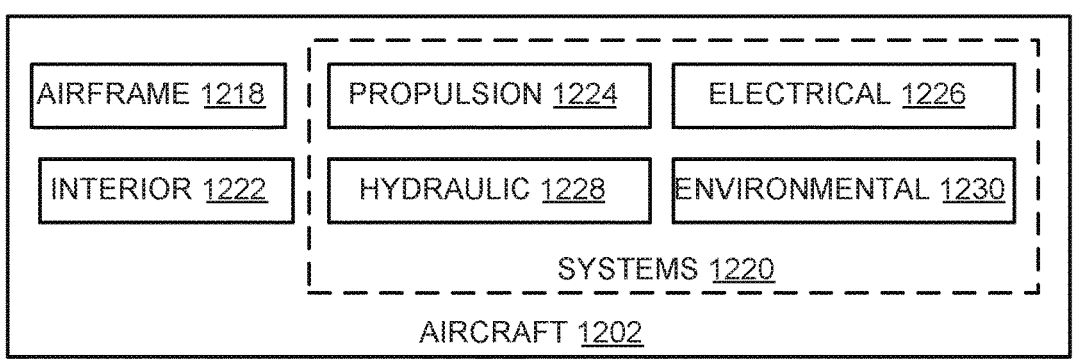

INSERTION OF CATALYST INTO DRY CARBON FIBERS PRIOR TO RESIN IMPREGNATION

FIELD

The disclosure relates to the field of composite materials, and in particular, to materials utilizing thermoset carbon fiber.

BACKGROUND

Pre-impregnated ("pre-preg") laminates of carbon fiber may be laid-up in a series of plies (tow/sections of carbon fiber tape) that are arranged into a complex shape and then cured into a composite part (e.g., a Carbon Fiber Reinforced Polymer (CFRP) part) having desired physical properties. Pre-preg laminates may be initially fabricated as a batch of dry carbon fibers that are oriented parallel with each other, which may then be impregnated with a thermoset resin. A resin may include, for example, a liquid suspension of multifunctional epoxy monomers which chemically react to form a solid polymer that binds carbon fibers together. Since the rate of polymerization may be particularly slow (e.g., operating on time scales that are unsuitable for mass fabrication), a catalyst is included within the resin to accelerate the rate of polymerization for the monomers. The pre-preg may then be laid-up into a desired form and cured.

However, it remains a complex process to balance the ratios of catalyst, monomer, and fiber. Since laminates may be fabricated as a series of layers that form a desired shape, it is desirable for resin to maintain sufficient adhesiveness (tack) at room temperature in order to ensure that plies adhere to each other, while still curing (engaging in accelerated polymerization) at an elevated temperature.

The curing kinetics of pre-preg laminates dictate that a balance be struck between work life and cure time. Work life corresponds with the amount of time that a ply exhibits tack (e.g., at room temperature) before curing. For pre-preg laminates that utilize a substantial amount of catalyst within the resin, work life is shortened and the resin rapidly becomes viscous, which is detrimental to layup processes. That is, although increased amounts of catalyst may provide highly accelerated cure times, they also may lead to an impractically short work life ("pot life") for a laminate. In contrast, if not enough catalyst is utilized then cure time is extended, which reduces efficiency.

Certain pre-preg laminates may utilize a heat-activated catalyst within the resin in order to selectively trigger accelerated polymerization and thereby increase work life. However, heat-activated catalysts within the resin may fail to adequately penetrate between carbon fibers during the impregnation process, resulting in non-uniform distribution of resin (and therefore non-uniform cure characteristics) throughout the resulting pre-preg laminate, which is undesirable. In further embodiments, instead of a pre-preg laminate, a dry pre-form laminate may be utilized that comprises a batch of dry fibers that occupies a three dimensional (3D) shape.

For at least the reasons discussed above, it is desirable to seek out enhanced pre-preg laminates that uniformly exhibit desired properties of work life and cure time.

SUMMARY

Embodiments described herein beneficially intersperse and/or bond catalyst capsules (e.g., capsules that release catalyst in response to heat) among a batch of dry carbon fibers, prior to impregnation of the carbon fibers with resin. Because dry carbon fibers are easily deflected with the application of force, the ability of the catalyst capsules to penetrate deep into a batch of fibers is enhanced. Thus, adding catalyst capsules prior to the impregnation process beneficially increases the ability of the catalyst capsules to be evenly dispersed in the resulting laminate, which ensures that the laminate exhibits uniform characteristics relating to cure time and/or work life.

One embodiment is a method that includes acquiring a batch of dry fibers, and acquiring a batch of catalyst capsules that each comprise catalyst that accelerates polymerization of monomers of a resin, and a shell that encapsulates the catalyst and liquefies at a curing temperature. The method further includes interspersing the catalyst capsules among the dry fibers, and impregnating the fibers with the resin after interspersing the catalyst capsules with the fibers.

Another embodiment is a method that includes acquiring a batch of dry fibers, and acquiring a batch of catalyst capsules. The catalyst capsules each comprise catalyst that accelerates polymerization of monomers of a resin, and a shell that encapsulates the catalyst and liquefies at a curing temperature. The method further comprises bonding the catalyst capsules with the dry fibers, and impregnating the fibers with the resin after interspersing the catalyst capsules with the fibers.

Another embodiment is a system that includes dry carbon fibers and a supply of catalyst capsules. Each catalyst capsule includes catalyst that accelerates polymerization of monomers of a resin, and a shell that encapsulates the catalyst and liquefies at a curing temperature. The system also includes a device that intersperses the catalyst capsules among dry carbon fibers, resulting in bonds between the capsules and the fibers.

Another embodiment is a method that includes forming a preform from dry carbon fibers, the preform including a plurality of catalyst capsules interspersed among the dry carbon fibers and bonded with the dry carbon fibers. The method also includes impregnating the preform with resin, liquefying shells of the catalyst capsules, and mixing catalyst from the catalyst capsules with the resin, thereby accelerating polymerization of the resin.

A further embodiment is a pre-form. The pre-form includes dry carbon fibers, and catalyst capsules interspersed among the dry carbon fibers and bonded with the dry carbon fibers. Each catalyst capsule includes catalyst that accelerates polymerization of resin monomers.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIGS. 5-6 are zoomed in views of carbon fibers to which catalyst capsules are adhered in an exemplary embodiment.

FIG. 7 is a flowchart illustrating a method for fabricating a carbon fiber laminate in an exemplary embodiment.

FIG. 12 is a flow diagram of aircraft production and service methodology in an exemplary embodiment.

FIG. 13 is a block diagram of an aircraft in an exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
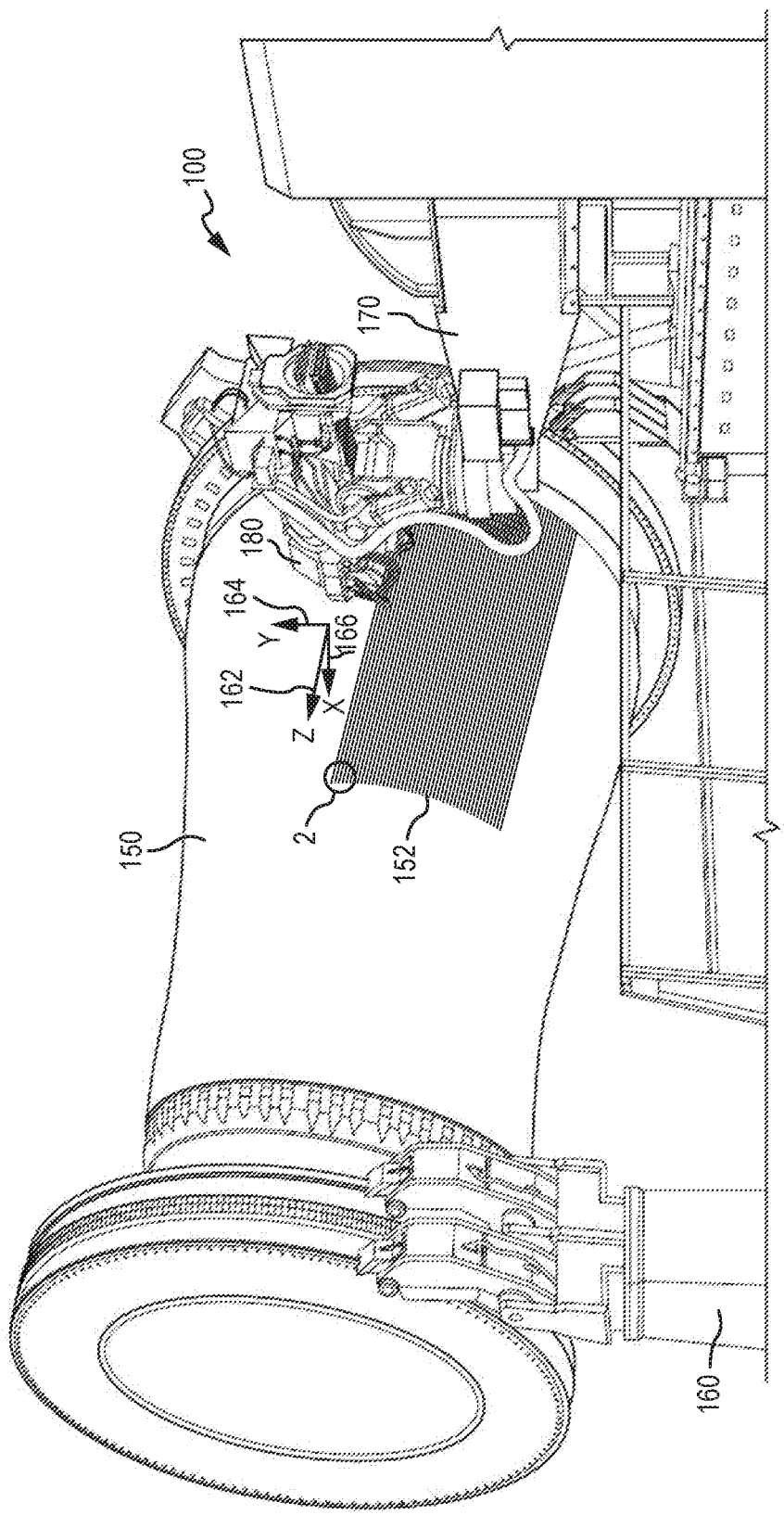
FIG. 1 is a diagram of layup of a laminate in an exemplary embodiment.

FIG. 1 is a diagram illustrating layup of a laminate in an exemplary embodiment. In this embodiment, an AFP machine 100 lays up plies 152 of carbon fiber laminate in order to lay up a laminate 150 for curing into a composite part. AFP machine 100 is held by support 170, and comprises any system or device capable of laying up plies 152 of carbon fiber tape for curing into a composite part (e.g., a CFRP part). AFP machine 100 includes end effector/head 180, which dispenses plies 152 during layup (e.g., concurrently). Plies 152 are laid-up to form laminate 150, which comprises one or more layers of material that will be cured into a single monolithic composite part. In this embodiment, laminate 150 comprises a fuselage section for an aircraft, and is held in place by rotational holder 160.

As AFP machine 100 operates to lay up plies 152 onto laminate 150, AFP machine 100 may move directly towards/away from laminate 150 along axis X 166, vertically upwards/downwards along axis Y 164, and/or laterally along axis Z 162. As used herein, when AFP machine 100 lays up multiple plies 152 concurrently during a single "sweep" of head 180, those plies 152 are collectively referred to as a single "course." A set of non-overlapping courses that are applied consecutively may be referred to as a layer. As layers are added to laminate 150, the strength of the resulting composite part is beneficially enhanced.

In order to ensure that plies 152 are laid-up quickly and efficiently, the operations of AFP machine 100 are controlled by an NC program. In one embodiment, the NC program provides instructions on a course-by-course basis for aligning/repositioning AFP machine 100, moving head 180, and laying up plies 152 onto laminate 150. In this manner, by performing the instructions in the NC program, AFP machine 100 fabricates a laminate for curing into a composite part. AFP machine 100 may further heat plies 152 to a tack temperature (e.g., 190° F.) in order to increase the tack of plies 152. After plies 152 have been laid-up to form the laminate, the laminate may be heated to a curing temperature (e.g., 290° F.) in order to cure the laminate into a solid composite part.

Figure 2:
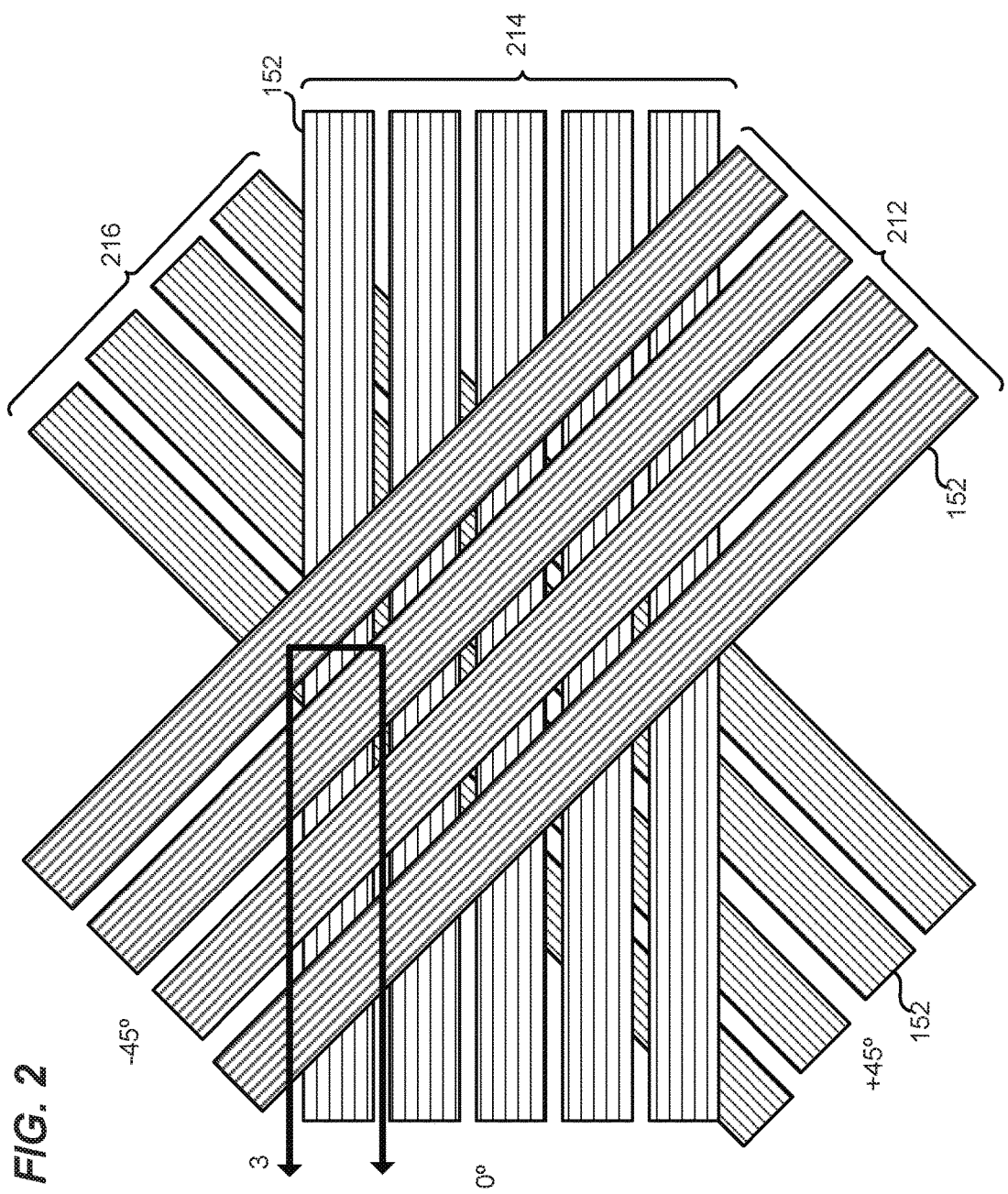
FIG. 2 is a diagram illustrating a zoomed-in view of individual plies of a laminate in an exemplary embodiment.

With context regarding the layup of carbon fiber laminates provided above with regard to FIG. 1, FIGS. 2-6 illustrate specific features of carbon fiber laminates. For example, FIG. 2 is a diagram illustrating a zoomed-in view of layers (212, 214, 216) of laminate 150 in an exemplary embodiment. As shown in FIG. 2, plies 152 are arranged into layers 212, 214, and 216. Plies 152 in each layer are substantially parallel, and exhibit a shared fiber orientation/direction. For example, plies 152 in layer 212 are oriented at −45°, plies 152 in layer 214 are oriented at 0°, and plies in layer 216 are oriented at +45°.

Figure 3:
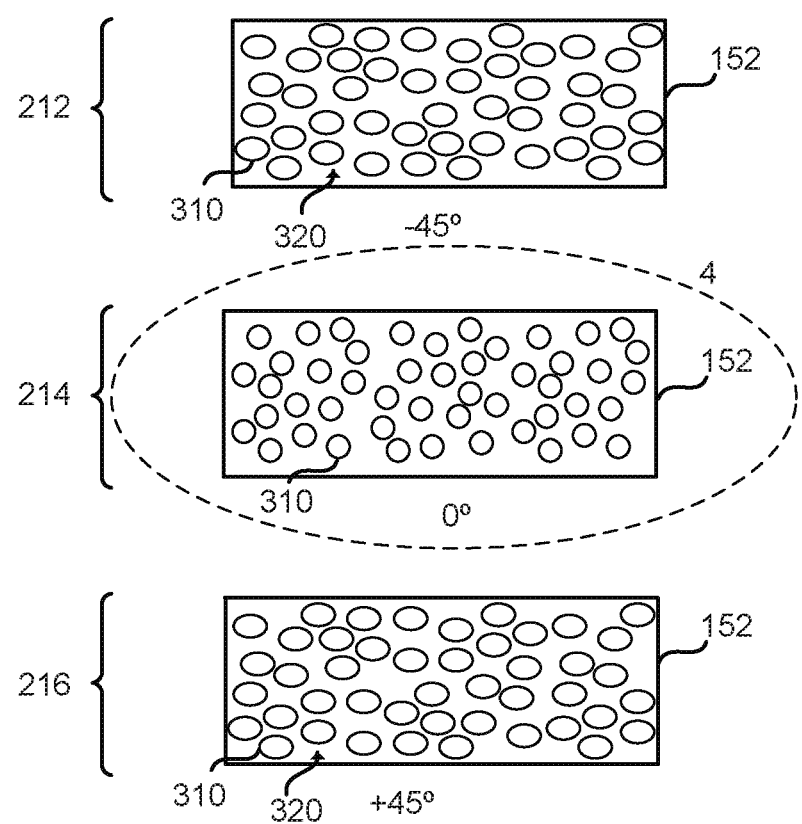
FIGS. 3-4 are section cut views of plies in an exemplary embodiment.
Figure 4:
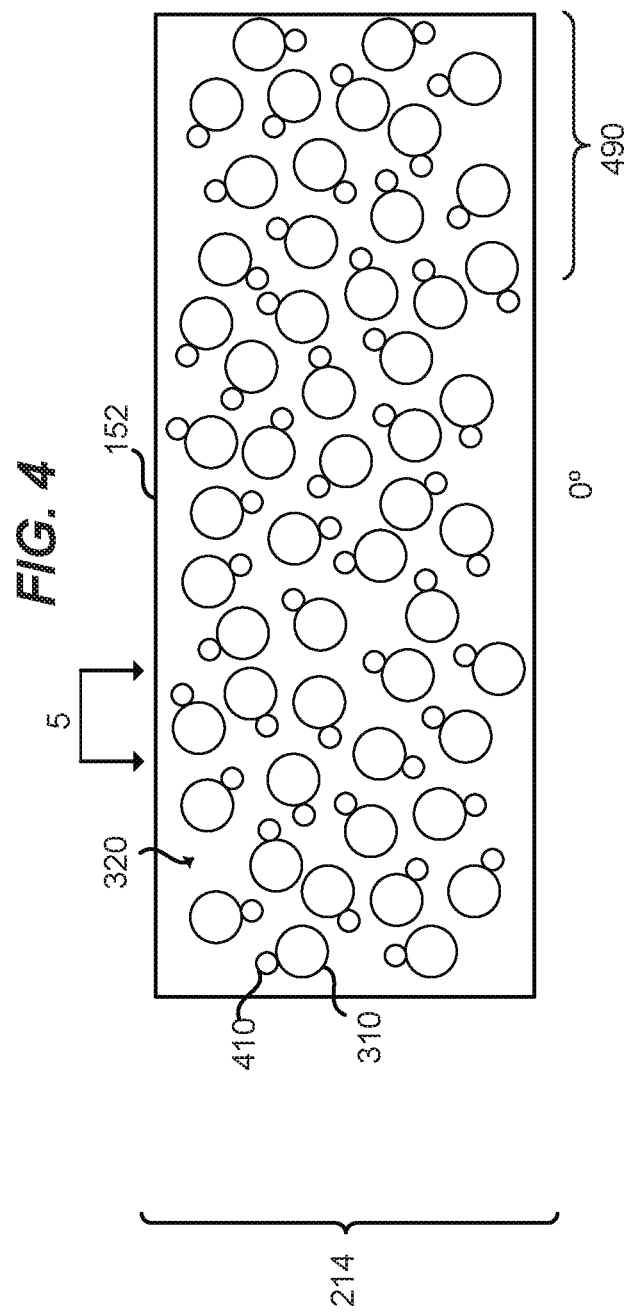

FIGS. 3-4 are section cut views of a laminate 150 in an exemplary embodiment. Specifically, FIG. 3 corresponds with view arrows 3 of FIG. 2. FIG. 3 illustrates that each layer (212, 214, 216) exhibits a different fiber orientation. Thus, even though individual fibers 310 each have the same diameter in this embodiment, fibers 310 in layers 212 and 214 appear as ovals owing to their orientation with respect to the direction of the section cut. FIG. 3 further illustrates resin 320 which occupies volume between individual fibers 310. FIG. 4 is a zoomed in view of layer 214 indicated by region 4 of FIG. 3. This illustrates that ply 152 of laminate 150 has been enhanced to include catalyst capsules 410, which are each bonded/coupled with a corresponding fiber. That is, catalyst capsules 410 are evenly interspersed among carbon fibers 310, instead of having a higher concentration along the edges of ply 152. Resin 320 forms a resin matrix 490.

FIGS. 5-6 are zoomed in views of carbon fibers 310 to which catalyst capsules 410 are bonded and/or adhered in an exemplary embodiment. The views illustrated by FIGS. 5 and 6 correspond with region 4 of FIG. 4. FIG. 5 illustrates an embodiment wherein capsules 410 are spherical in shape (e.g., having a one micron diameter that is one-fifth that of a carbon fiber 310) while FIG. 6 illustrates an embodiment wherein capsules 410 are cylindrical in shape (e.g., having a diameter/thickness between two fifths and three fifths of that of a corresponding carbon fiber 310). In both embodiments, fiber 310 includes a surface 510 which may include surface feature 512 (e.g., a sizing/chemical treatment that attracts resin monomers, a surface modification that promotes wetting of fiber 310 by resin, etc.). In embodiments wherein surface feature 512 comprises a sizing, it may remain desirable for resin 320 to chemically react with the sizing, before catalyst (e.g., aliphatic primary amines, aliphatic secondary amines, aromatic amines, or combinations thereof) are released by catalyst capsules 410. Similarly, in embodiments where surface feature 512 comprises a surface modification, it may remain desirable for resin to wet surface feature 512 before catalyst is released by catalyst capsules 410.

Catalyst capsules 410 each include shell 520, which includes surface 522. Surface 522 of a catalyst capsule 410 may adhere to surface 510 of fiber 310 via, for example, static electricity, van der Waals forces, a chemical reaction, etc., between surface feature 512 and surface 522, or between surface 510 and surface 522. In one embodiment, surface 510 includes nanotubes or other features which mediate the attraction of catalyst capsules 410 to fiber 310. Heating catalyst capsules 410 to the curing temperature may liquefy shell 520, releasing catalyst 524 and accelerating polymerization. In one embodiment, shell 520 comprises a second catalyst that melts above the curing temperature in order to release catalyst 524. In a further embodiment, capsule 410 includes a pocket of gas (not shown) which under pressure ruptures shell 520.

Illustrative details of the creation of plies 152 will be discussed with regard to FIG. 7. Assume, for this embodiment, that the various separate components of plies 152 discussed above have not yet been united.

FIG. 7 is a flowchart illustrating a method 700 for fabricating a laminate (e.g., a ply of pre-preg carbon fiber tape) in an exemplary embodiment. Method 700 addresses the problem of catalyst particles in resin inadequately penetrating through dry fibers ("fiber filtration"). The steps of method 700 are described with reference to plies 152 of FIG. 1, but those skilled in the art will appreciate that method 700 may be performed in other carbon fiber and curable materials. The steps of the flowcharts described herein are not all inclusive and may include other steps not shown. The steps described herein may also be performed in an alternative order.

According to method 700, a batch of dry carbon fibers 310 that are oriented in parallel is acquired (step 702). For example, the dry carbon fibers 310 may comprise a dry carbon fiber tape. The batch of fibers 310 is considered "dry" in that the batch has not been impregnated with curable/thermoset resin monomers awaiting polymerization. In one embodiment, fibers 310 may exhibit a five micron diameter.

A batch of catalyst capsules 410 is also acquired (step 704). The catalyst capsules 410 include catalyst 524 which accelerates the polymerization of monomers of resin (which have not yet been added to dry carbon fibers 310). The catalyst capsules 410 include shells 520 which surround molecules of catalyst 524 for delivery and use in curing. At this point in time, the catalyst capsules 410 are separate from and independent of other resin components, such as resin monomers. The size of catalyst capsules 410 may be chosen in order to ensure a volume ratio between ten to one and two to one (e.g., five to one) of carbon fibers 310 to capsules 410. For example, in embodiments where catalyst capsules 410 are spherical, they may exhibit a diameter of one micron, and thus five catalyst capsules may attach to a fiber 310 along the circumference of fiber 310 at each location along the length of fiber 310. In embodiments where catalyst capsules 410 are elongated cylindrical shapes/filaments, they may exhibit a diameter of 2.2 microns in order to conform with such a desired ratio.

Figure 8:
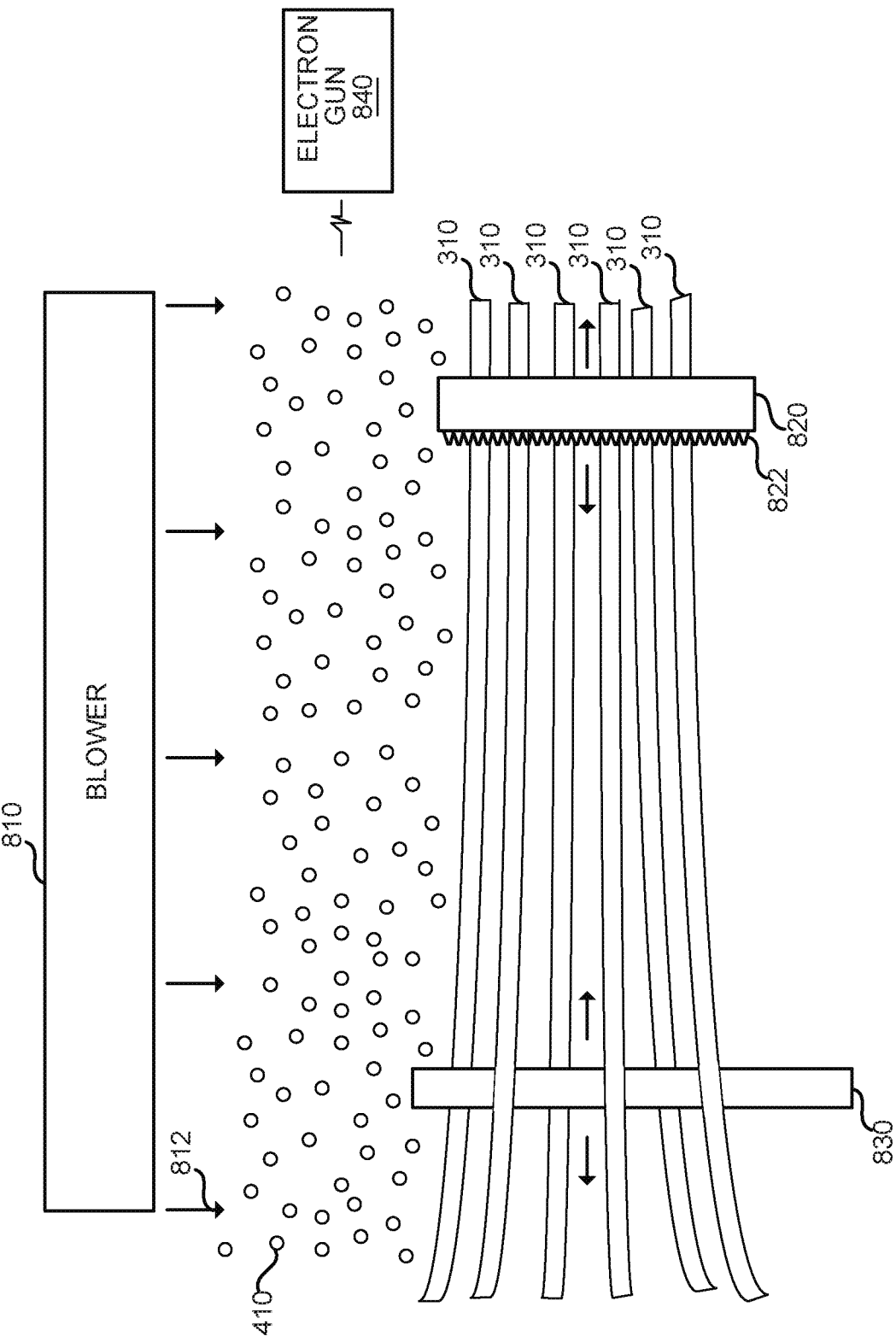
FIG. 8 is a diagram illustrating devices that intersperse catalyst capsules among dry carbon fibers in an exemplary embodiment.

Catalyst capsules 410 are then interspersed among fibers 310 (step 706). This process is illustrated in FIG. 8, and may comprise, for example, operating blower 810 to blow capsules 410 through fibers 310 (e.g. by deflecting fibers 310 while blowing capsules 410), operating comb 820 (including teeth 822) to comb capsules 410 through fibers 310, utilizing tension bar 830 to separate fibers 310 and then sifting capsules 410 through fibers 310, etc. Regardless of the specific technique used, as capsules 410 are interspersed among fibers 310, they adhere to fibers 310 for the reasons discussed above. This means that the act of interspersing catalyst capsules 410 among fibers 310 forms a bond that couples capsules 410 to fibers 310 (step 708). The interspersion process ensures that capsules 410 are evenly distributed among fibers 310. Furthermore, fibers 310 remain dry even after capsules 410 are interspersed, because no resin (e.g., resin monomer, etc.) has been introduced to fibers 310. During the interspersion process it remains desirable to maintain the linearity of individual carbon fibers 310. Thus, the amount of deflection of carbon fibers 310 may be chosen to ensure capsule penetration, while avoiding individual fibers 310 crumpling or breaking.

At this point in time, bonds may be formed to couple capsules 410 with fibers 310 via static electricity, a chemical reaction between shell 520 and a surface feature 512 on the fibers, van der Waals forces, etc. In embodiments where static electricity is utilized, an electron gun 840 or other device may be utilized to apply a charge to capsules 410 and ensure sufficient adherence of capsules 410 to fibers 310. In embodiments where capsules 410 are chemically bonded to surface 510 of carbon fibers 310, capsules 410 may be applied via a chemical bath (sans resin) to fibers 310, wherein capsules 410 are included within a chemical suspension.

Next, fibers 310 are impregnated with resin 320, including resin monomers awaiting polymerization (step 710). Impregnating the batch of fibers 310 with resin 320 may comprise applying pressure to resin 320, drawing a vacuum proximate to fibers 310, or any other technique that causes resin 320 to flow between fibers 310. This step is performed after capsules 410 have already been dispersed among fibers 310. Since capsules 410 are already interspersed among fibers 310, fiber filtration ensures that capsules 410 will not be pushed out from between fibers 310 during the impregnation process.

Resin 320 is catalyst-free, which means that resin 320 does not include chemical components that accelerate the polymerization of monomers within resin 320. Hence, resin 320 is less viscous than catalyzed resin, which promotes better wetting of fibers 310 than catalyzed resin. However, resin 320 may still include resin monomers and/or a toughening phase (e.g., an interpenetrating network phase). Since resin 320 no longer includes bulky components such as capsules 410, components of resin 320 are not trapped or otherwise filtered by fibers 310 during impregnation. Within the resulting laminate, catalyst capsules 410 occupy between ten and fifteen percent of a combined volume of resin 320, catalyst capsules 410, and fibers 310. Resin 320 occupies between thirty and thirty five percent of a combined volume of resin 320, catalyst capsules 410, and fibers 310. Furthermore, fibers 310 occupy between fifty and sixty percent of a combined volume of resin 320, catalyst capsules 410, and fibers 310. In one embodiment, the act of impregnating fibers 310 with resin serves to decouple interspersed catalyst capsules 410 from fibers 310 (step 712). The impregnation process may form a resin matrix 490 occupying space between the fibers.

After the dry fibers have been impregnated with resin, the resulting product may be implemented as a pre-preg carbon fiber tape. The carbon fiber tape may be stored for a period of time, and then laid-up as a series of plies in order to form a desired shape for a composite part. Step 714 involves liquefying the shells of capsules 410, and depending upon the embodiment may be performed prior to tacking and layup, before curing, or even during curing as the tape is heated.

In some environments, an AFP machine may heat the carbon fiber tape to a tack temperature (e.g., 190° F.) which enhances the level of "tack" of the tape, ensuring better adhesion of plies (step 716). The tack temperature allows tacking together layers of tape into a laminate, while remaining below a temperature at which catalyst is released from catalyst capsules 410. At this tack temperature, catalyst capsules 410 remain solid and have not yet liquefied. After layup has been completed, the uncured part may then be moved to an autoclave for curing. In the autoclave, the uncured part, including the impregnated fibers, may be heated to a curing temperature (e.g., 290° F.) at which shells 520 of capsules 410 liquefy, releasing catalyst 524 (step 718). Catalyst 524 further mixes with resin 320 when released, accelerating polymerization and triggering curing. The curing temperature is sufficiently high that catalyst 524 will not be unintentionally released during layup. Thus, the temperature at which catalyst 524 is released is set high enough to ensure that catalyst 524 is not unintentionally released prior to curing. The temperature at which catalyst 524 is released may, for example, be the same as the cure temperature, or below the cure temperature. In one embodiment, catalyst 524 is released at a temperature used during resin infusion as part of initial curing. In any case, when shells 520 are exposed to the curing temperature, shells 520 will liquefy.

Method 700 provides a substantial benefit by ensuring that catalyst capsules are distributed evenly throughout carbon fiber laminate prior to curing. Since the capsules are interspersed while the fibers are dry, the carbon fibers may be easily flexed or otherwise deflected, enabling the capsules to penetrate deep into a batch of fibers without interference.

Figure 9:
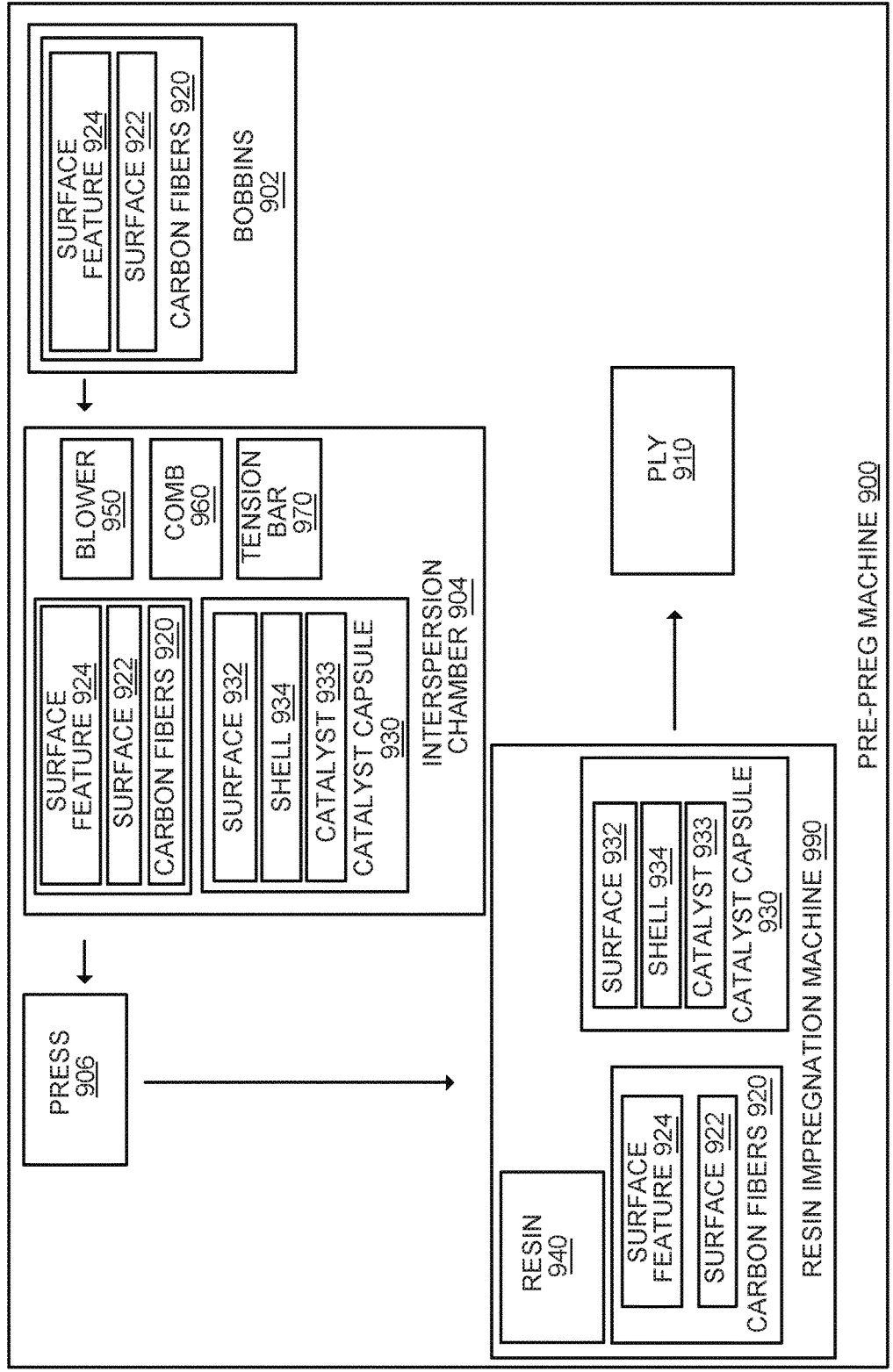
FIG. 9 is a block diagram illustrating a system for fabricating a carbon fiber laminate in an exemplary embodiment.

FIG. 9 is a block diagram illustrating a pre-preg machine 900 for fabricating a pre-preg carbon fiber ply 910 in an exemplary embodiment. Specifically, FIG. 9 illustrates that carbon fibers 920, including surface 922 and surface feature 924, is unrolled from bobbins 902. Catalyst capsules 930, including shell 934, catalyst 933, and surface 932, are interspersed among fibers 920 at interspersion chamber 904, which may include any suitable combination of blower 950, comb 960, and tension bar 970. These operations may result in static bonds, van der Waals bonds, or even chemical bonds between the capsules 930 and the fibers 920. Press 906 compacts fibers 920 together, and resin impregnation machine 990 is utilized to impregnate fibers 920 with resin 940, resulting in ply 910. Since capsules 930 are already interspersed among the fibers 920, the act of impregnating fibers 920 with resin 940 also mixes resin 940 among capsules 930.

Figure 10:
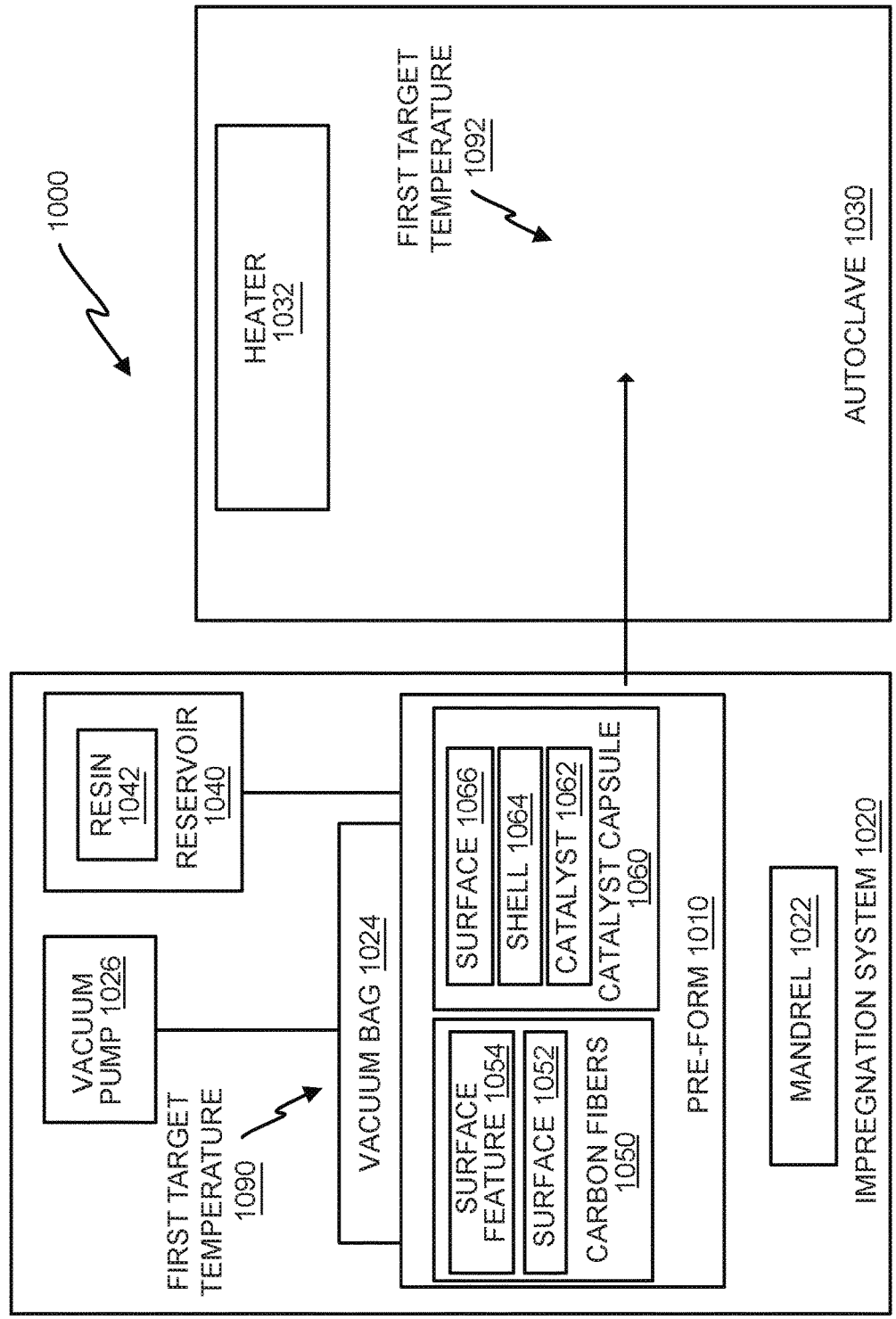
FIG. 10 is a block diagram illustrating a pre-form comprising dry carbon fiber and pre-interspersed catalyst capsules in an exemplary embodiment.

FIG. 10 is a block diagram 1000 illustrating a pre-form 1010 comprising dry carbon fibers 1050 and pre-interspersed catalyst capsules 1060 in an exemplary embodiment. According to FIG. 10, pre-form 1010 includes carbon fibers 1050, which each include surface 1052, as well as surface features 1054. Catalyst capsules 1060 are interspersed among dry carbon fibers 1050, and include surface 1066, shells 1064, and catalyst 1062. Pre-form 1010 may already be pressed/shaped into a desired geometry for curing, or may be awaiting pressing into a desired geometry by mandrel 1022 or other suitable tooling. In this embodiment, pre-form 1010 is placed between vacuum bag 1024 and mandrel 1022 and heated to first target temperature 1090. Vacuum bag 1024 is sealed to mandrel 1022, ensuring that a vacuum may be drawn pressing pre-form 1010 into mandrel 1022. The vacuum is drawn by vacuum pump 1026, which provides a further benefit by drawing resin 1042 (e.g., a catalyst-free resin) from reservoir 1040 into pre-form 1010, impregnating pre-form 1010. After pre-form 1010 has been impregnated with resin, pre-form 1010 is placed into autoclave 1030 at second target temperature 1092. In autoclave 1030, the application of heat (e.g., from heater 1032) and/or pressure serves to liquefy catalyst capsules 1060, mixing catalyst 1062 with resin 1042 and resulting in accelerated polymerization and the creation of a composite part.

Figure 11:
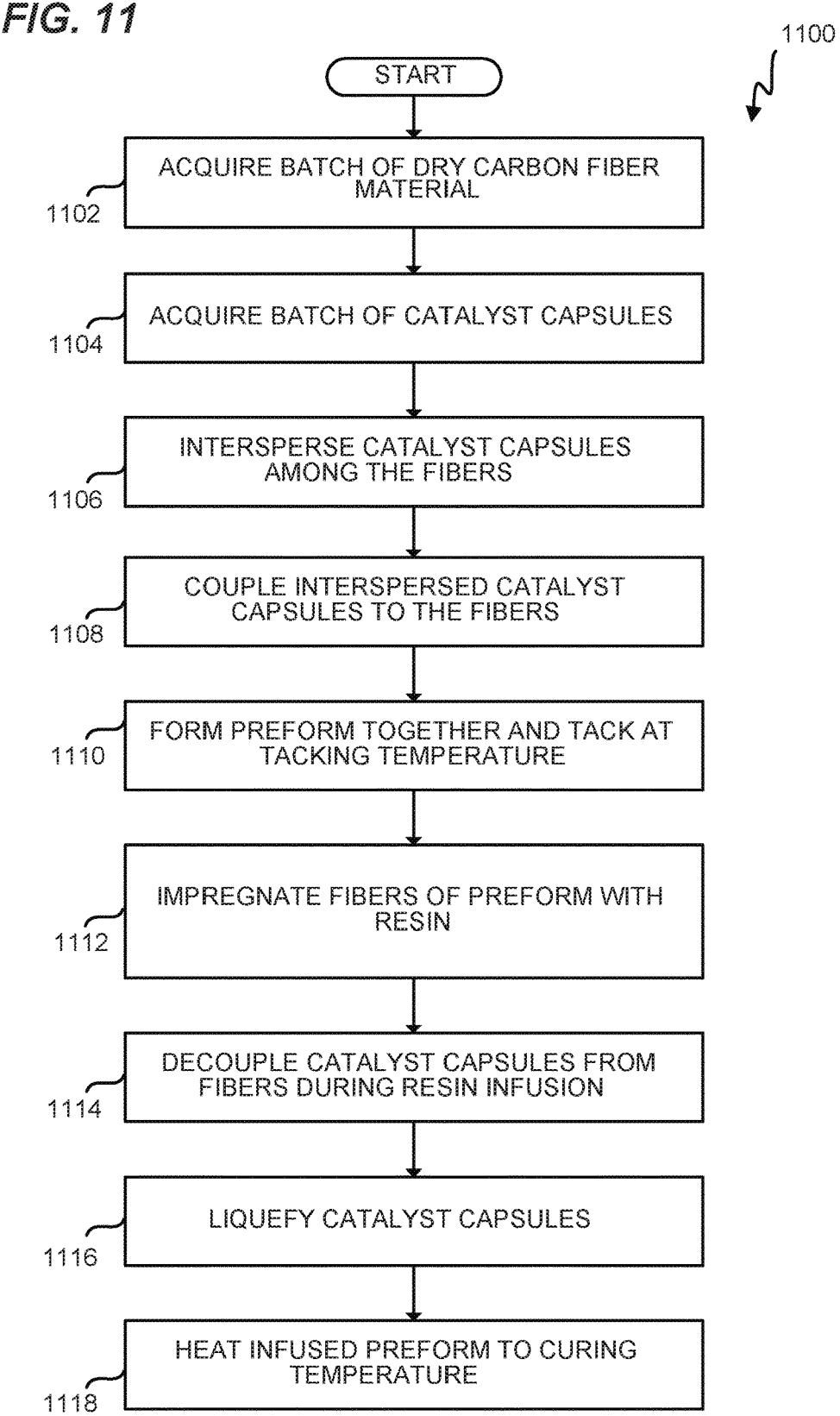
FIG. 11 is a flowchart illustrating a method of utilizing a pre-form comprising dry carbon fiber and pre-interspersed catalyst capsules in an exemplary embodiment.

FIG. 11 is a flowchart illustrating a method 1100 of utilizing a pre-form comprising dry carbon fiber and pre-interspersed catalyst capsules in an exemplary embodiment. According to method 1100, a batch of dry carbon material comprising fibers 1050 that are oriented in parallel is acquired (step 1102).

A batch of catalyst capsules 410 is also acquired (step 1104). Catalyst capsules 1060 are then interspersed among fibers 310 (step 1106). This process is illustrated in FIG. 8, and may comprise, for example, operating blower 810 to blow capsules 1060 through fibers 1050 (e.g. by deflecting fibers 1050 while blowing capsules 1060), operating comb 820 (including teeth 822) to comb capsules 1060 through fibers 1050, utilizing tension bar 830 to separate fibers 1050 and then sifting capsules 1060 through fibers 1050, etc. Regardless of the specific technique used, as capsules 1060 are interspersed among fibers 1050, they adhere to fibers 1050 for the reasons discussed above. This means that the act of interspersing catalyst capsules 1060 among fibers 1050 forms a bond that couples capsules 1060 to fibers 1050 (step 1108).

As further illustrated in FIG. 11, pre-form 1010 is formed together and tacked at optionally tacked at a tacking temperature (e.g., 190° F.) (step 1110). A tackifier may optionally be added to the dry fibers to tack at this stage (e.g., depending on the complexity of the form). The tackifier may comprise a thermoplastic added to the fibers, such as via spraying onto the fibers. Forming of pre-form 1010 may further comprise pressing or holding pre-form 1010 in a desired shape (e.g., via compression with a vacuum chamber or a roller). The tack temperature is below a curing temperature at which the shells of capsules 1060 have liquefied/dissolved. This consolidation may even occur later when the pre-form 1010 is placed under compression from a vacuum bag and/or autoclave while heat is added.

After pre-form 1010 has been placed in a desired location for impregnation (e.g., within a vacuum bag), it is impregnated with resin 1042 (step 1112). Impregnating pre-form 1010 with resin 1042 may break bonds between catalyst capsules 1060 and dry carbon fibers 1050 (e.g., by overcoming bonding forces resulting from static forces, van der Waals forces, a chemical reaction between catalyst capsules 1060 and surface features 1054 on carbon fibers 1050, etc.), thereby decoupling fibers 1050 from capsules 1060 (step 1114). This may mix catalyst capsules 1060 into resin 1042, and may further enable resin 1042 to wet dry carbon fibers 1050 at locations previously occupied by catalyst capsules 1060.

The impregnated pre-form 1010 may further be heated to until shells of catalyst capsules 1060 liquefy (step 1116) and a curing temperature (e.g., 290° F.) is reached (step 1118). Pre-form 1010 may further be compressed in autoclave 1030 to facilitate curing of. That is, heat activates catalyst capsules 1060 by liquefying shells 1064, mixing catalyst 1062 with resin 1042 and accelerating polymerization of resin 1042.

EXAMPLES

In the following examples, additional processes, systems, and methods are described in the context of fabricating carbon fiber laminate.

Referring more particularly to the drawings, embodiments of the disclosure may be described in the context of an aircraft manufacturing and service method 1200 as shown in FIG. 12 and an aircraft 1202 as shown in FIG. 13. During pre-production, exemplary method 1200 may include specification and design 1204 of the aircraft 1202 and material procurement 1206. During production, component and subassembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine maintenance and service 1216 (which may also include modification, reconfiguration, refurbishment, and so on). Apparatus and methods embodied herein may be employed during any one or more suitable stages of the production and service method 1200 (e.g., specification and design 1204, material procurement 1206, component and subassembly manufacturing 1208, system integration 1210, certification and delivery 1212, service 1214, maintenance and service 1216) and/or any suitable component of aircraft 1202 (e.g., airframe 1218, systems 1220, interior 1222, propulsion 1224, electrical 1226, hydraulic 1228, environmental 1230).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 1202 produced by exemplary method 1200 may include an airframe 1218 with a plurality of systems 1220 and an interior 1222. Examples of high-level systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1200. For example, components or subassemblies corresponding to production stage 1208 may be fabricated or manufactured in a manner similar to components or subassemblies produced while the aircraft 1202 is in service. Also, one or more apparatus embodiments, method embodiments, or a combination thereof may be utilized during the production stages 1208 and 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation, to maintenance and service 1216. For example, the techniques and systems described herein may be used for steps 1206, 1208, 1210, 1214, and/or 1216, and/or may be used for airframe 1218 and/or interior 1222. These techniques and systems may even be utilized for systems 1220, including for example propulsion 1224, electrical 1226, hydraulic 1228, and/or environmental 1230.

In one embodiment, plies 152 comprise a portion of airframe 1218, and are laid-up and cured into a composite part during component and subassembly manufacturing 1208. The composite part may then be assembled into an aircraft in system integration 1210, and then be utilized in service 1214 until wear renders the part unusable. Then, in maintenance and service 1216, the part may be discarded and replaced with a newly manufactured part. Plies 152 may be utilized throughout component and subassembly manufacturing 1208 in order to manufacture new composite parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A method for fabricating prepreg for a composite part, the method comprising:
   acquiring a batch of dry fibers for composite materials;
   acquiring a batch of catalyst capsules for composite materials, wherein each catalyst capsule comprises:
      catalyst that accelerates polymerization of monomers of a resin; and
      a shell that encapsulates the catalyst and liquefies at a curing temperature;
   applying a charge to the catalyst capsules via an electron gun, prior to resin impregnation;
   interspersing the catalyst capsules among the dry fibers; and
   impregnating the fibers with the resin after interspersing the catalyst capsules with the fibers.

2. The method of claim 1 wherein:
   interspersing the catalyst capsules among the fibers comprises blowing the catalyst capsules through the fibers.

3. The method of claim 1 further comprising:
   binding the catalyst capsules to the fibers via static electricity, prior to resin impregnation.

4. The method of claim 1 wherein:
   the catalyst capsules occupy between ten and fifteen percent of a combined volume of the resin, catalyst capsules, and fibers.

5. The method of claim 1 wherein:
the batch of fibers consists of parallel fibers, spans multiple fibers across its width and spans multiple fibers across its height.

6. The method of claim 1 wherein:
a ratio of a diameter of the capsules to a diameter of the fibers is between one-fifth and three-fifths.

7. The method of claim 1 wherein:
the capsules have a diameter of one micron, and the fibers have a diameter of five microns.

8. The method of claim 1 wherein:
a volume ratio of the dry fibers to the catalyst capsules is between ten to one and two to one.

9. A method for fabricating and utilizing prepreg for a composite part, the method comprising:
applying a charge to catalyst capsules for composite materials via an electron gun;
forming a preform from dry carbon fibers for composite materials, the preform including the catalyst capsules, the catalyst capsules being interspersed among the dry carbon fibers and bonded with the dry carbon fibers;
impregnating the preform with resin;
liquefying shells of the catalyst capsules; and
mixing catalyst from the catalyst capsules with the resin, thereby accelerating polymerization of the resin.

10. The method of claim 9 wherein:
the resin comprises a catalyst-free resin.

11. The method of claim 9 further comprising:
tacking the preform at a tack temperature which is lower than a curing temperature at which the shells of the catalyst capsules liquefy.

12. The method of claim 9 further comprising:
breaking bonds between the capsules and the fibers by overcoming bonding forces resulting from static electricity.

13. The method of claim 9 further comprising:
breaking bonds between the capsules and the fibers by overcoming bonding forces resulting from van der Waals forces.

14. The method of claim 9 wherein:
impregnating the preform with resin comprises:
covering the preform with a vacuum bag; and
compressing the preform while drawing resin through the preform.

15. A method for fabricating prepreg for a composite part, the method comprising:
acquiring a batch of dry fibers for composite materials;
acquiring a batch of catalyst capsules for composite materials, wherein each catalyst capsule comprises:
catalyst that accelerates polymerization of monomers of a resin; and
a shell that encapsulates the catalyst and liquefies at a curing temperature;
applying a charge to the catalyst capsules via an electron gun, prior to resin impregnation;
bonding the catalyst capsules with the dry fibers; and
impregnating the fibers with the resin after interspersing the catalyst capsules with the fibers.

16. The method of claim 15 further comprising:
interspersing the catalyst capsules among the dry fibers.

17. The method of claim 15 further comprising:
heating the catalyst capsules to the curing temperature, thereby releasing the catalyst and accelerating polymerization.

18. The method of claim 15 wherein:
impregnating the fibers with the resin monomers comprises causing the resin to flow between the fibers to form a resin matrix occupying space between the fibers.

* * * * *